United States Patent [19]

Surkamp

[11] Patent Number: 4,727,910
[45] Date of Patent: Mar. 1, 1988

[54] DRIVE CONNECTION FOR A RECIPROCATING A CONNECTING ROD FROM A DRIVE SHAFT THROUGH AN ECCENTRIC CAM

[75] Inventor: Paul Surkamp, Kempen, Fed. Rep. of Germany

[73] Assignee: Kaiser GmbH & Co. KG, Fed. Rep. of Germany

[21] Appl. No.: 28,963

[22] Filed: Mar. 23, 1987

[51] Int. Cl.⁴ ............................................. D03C 1/00
[52] U.S. Cl. .................................................. 139/76
[58] Field of Search .......................... 139/66 R, 76, 77

[56] References Cited

U.S. PATENT DOCUMENTS

| 4,367,770 | 1/1983 | Schwarz | 139/76 |
| 4,542,769 | 9/1985 | Julich | 139/76 |
| 4,597,417 | 7/1986 | Schwarz | 139/76 |

*Primary Examiner*—Henry S. Jaudon
*Attorney, Agent, or Firm*—Shefte, Pinckney & Sawyer

[57] ABSTRACT

A drive connection for reciprocating a connecting rod from a drive shaft through an eccentric cam to manipulate a harness frame of a textile loom from one shedding position to another. The drive connection includes a pawl mounted on an eccentric cam and movable into and out of engagement in recesses in an annular drive ring only when the eccentric cam is in predetermined dwell positions. The pawl is controlled by a locking element against any change of position after it is engaged and it is continually biased in the direction of engagement. An actuating lever mounted on the connecting rod actuates the locking element to cause disengagement of the pawl from the drive ring recess. The actuating lever is controlled by an operating member that operates according to a predetermined program, and the actuating lever is prevented from actuation by blocking members that are spaced to allow actuation only at a dwell position.

17 Claims, 7 Drawing Figures

DRIVE CONNECTION FOR A RECIPROCATING A CONNECTING ROD FROM A DRIVE SHAFT THROUGH AN ECCENTRIC CAM

BACKGROUND OF THE INVENTION

The present invention relates to a drive connection for reciprocating a connecting rod from a drive shaft through an eccentric cam, and more particularly to such a drive connection that transmits intermittent drive shaft rotation into reciprocation of a connecting rod for intermittently reciprocating an operating member such as a harness frame of a textile loom.

Improvements in textile looms have been directed to increasing the rate of production with enhanced quality. This requires high speed operation with reliable mechanical performance. These desired characteristics are not easily attainable because of the problems encountered in attempting to operate reciprocating mechanisms, such as harness frames, that must reciprocate at high speeds yet stop accurately for proper operational positioning. As operating speeds of looms have increased, the problem of reliable control and positioning of harness frames has become of considerable concern.

It is to this concern that the present invention is directed in providing a drive connection capable of high speed reciprocation and reliable positioning control.

SUMMARY OF THE INVENTION

Briefly described, the drive connection of the present invention reciprocates an operating member, such as a harness frame of a textile loom, by transmitting intermittent rotation of a drive shaft through an eccentric cam into reciprocation of a connecting rod. The drive connection includes an annular drive ring fixed on the drive shaft and having a recess formed therein. A pawl pivotally mounted on the eccentric cam engages in and disengages from the recess for selective drive connection and disconnection of the cam to the drive shaft. Pawl locking means releasably lock the pawl in the recess for driving connection. Actuating means mounted on the connecting rod is engagable with the locking means to disengage the pawl from the recess and thereby disconnect the cam from the shaft upon programmed operation of the actuating means. Blocking means mounted on the cam blocks the actuating means from engagement with or disengagement from the locking means except when the cam is positioning the connecting rod in a predetermined position, such as a shed position of a harness frame.

Preferably, biasing means normally bias the pawl into engagement in the recess and the actuating means overcomes this biasing in engaging the locking means to disengage the pawl. An operating member programably engages with the actuating means to operate the actuating means to engage the locking means and thereby disengage the pawl from the recess. When not engaged by the operating member, the actuating means is biased out of engagement with the locking means. The locking means includes a locking element on the pawl releasably engagable against a stop that is preferably formed on the blocking means, with the actuating means acting on the locking element to release it from the stop. The locking element may be spring biased in locking engagement with the stop, and the actuating means may be spring biased out of engagement with the pawl, with the operating member acting against the biasing to operate the actuating means. Further, spring means preferably bias the pawl in engagement in the recess to assure engagement but is sufficiently weak to be overcome by the actuating means.

In one embodiment, the operating member is engagable with the pawl to retain the pawl in the recess and is movable between such pawl retaining position and actuating means operating position. In this embodiment, the pawl preferably has a resilient segment engagable by a corresponding resilient segment of the actuating means for biasing of the pawl in engagement in the recess.

In the preferred embodiment, the pawl is in the form of a rocker member having one leg formed with a recess engaging projection and the other leg having the locking element thereon. The blocking means is in the form of two blocking members mounted on the eccentric cam and spaced apart sufficiently to permit movement of the actuating means therebetween when the cam is positioning the connecting rod in a predetermined position, to release the locking element from the stop, which is formed on one of the blocking members.

To accommodate operation at opposite cam positions, such as at the opposite shed positions of a harness frame of a textile loom, there are two opposed actuating means and two opposed operating members.

With the arrangement of the present invention, high speed manipulation is possible with the pawl being locked in operating engagement in the recess except upon operation of the actuating means to disengage the pawl at the predetermined cam positions, for dwelling of the cam during subsequent drive shaft rotation until a drive shaft recess is again positioned at the pawl, at which time the pawl automatically engages in the recess to engage the cam for rotation again with the drive shaft. The operation involves easy and smooth operation at high speed with minimized wear and reduced noise in operation.

DETAILED DESCRIPTION OF THE PREFERRED EMBODIMENTS

Figure 1:
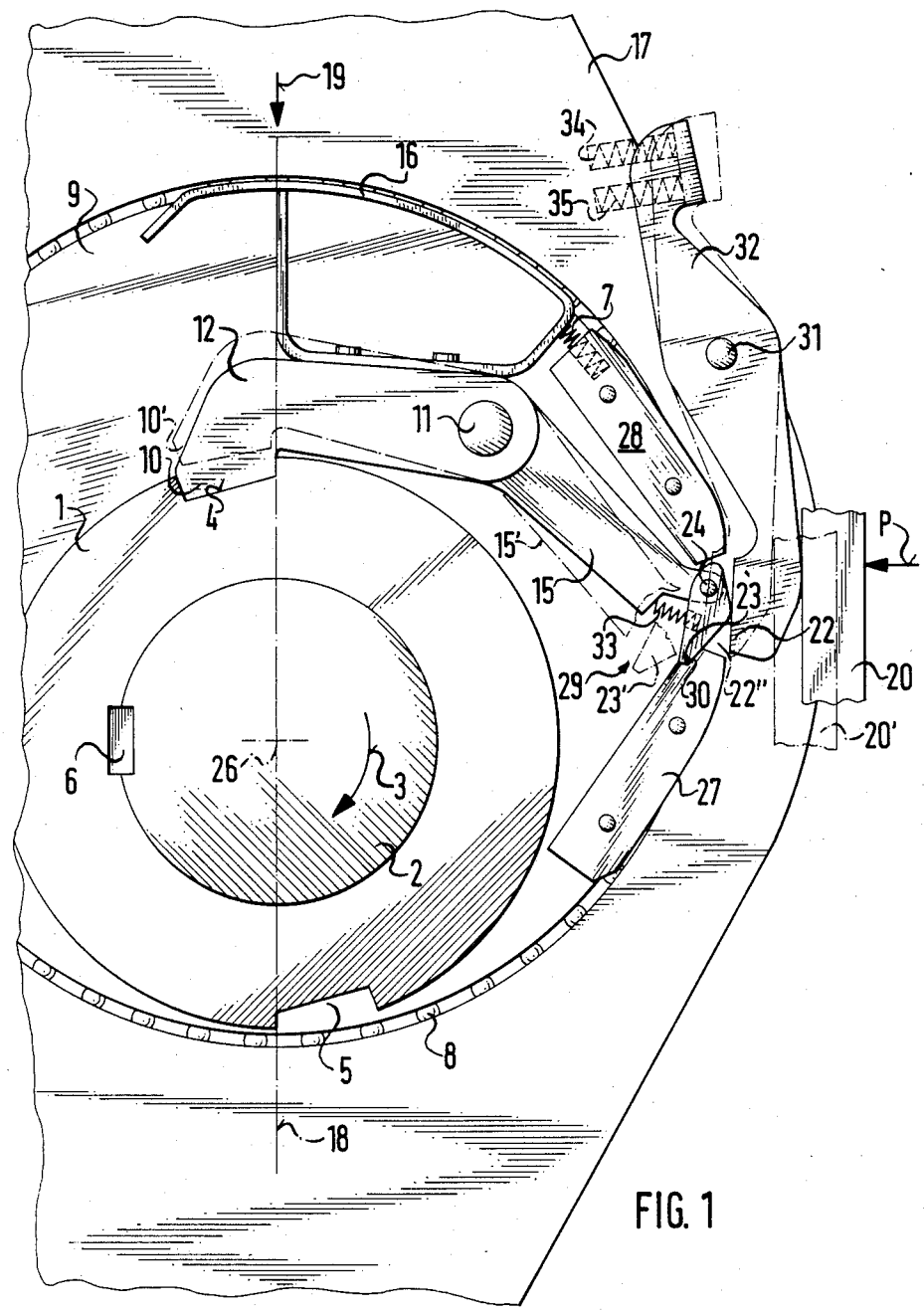
FIG. 1 is a partial elevational view of the preferred embodiment of the drive connection of the present invention.
Figure 2:
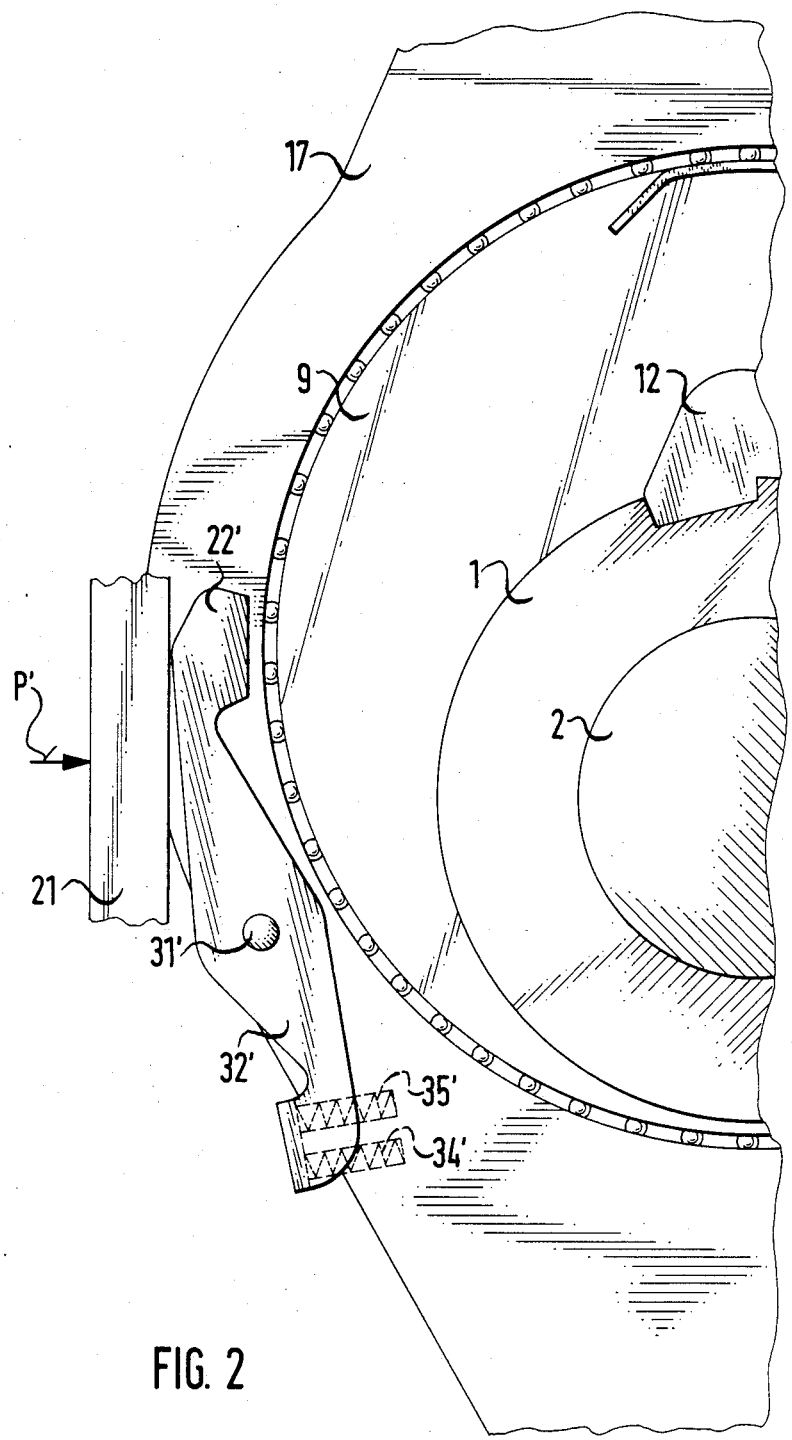
FIG. 2 is an elevational view showing a portion of the drive connection that is to the left of the portion illustrated in FIG. 1.

The preferred embodiment of the drive connection of the present invention illustrated in FIGS. 1 and 2 is incorporated in a textile loom for controlling the manipulation of a harness frame between opposite shedding positions. The drive connection includes an annular drive ring 1 fixed on a drive shaft 2 that is intermittently rotated by conventional means (not shown) through 180 degrees in the direction of the arrow 3. After each intermittent rotation, the drive shaft dwells for a predetermined length of time and then rotates again through 180 degrees. The drive ring 1 is fixed on the drive shaft 2 by a key 6, and has a pair of diametrically opposed recesses 4 and 5 formed in its outer surface.

An eccentric cam 9 is rotatably mounted eccentrically on a portion of the drive ring 1 and in a roller bearing 8. A stud 11 projects from the face of the cam 9 and has pivotally mounted thereon a pawl 12 that has a tip or projection 10 engagable in the drive ring recesses 4 and 5. The pawl 12 is a rocker member having the projection 10 on one leg that carries a bracket 16 that is spring loaded to bias the pawl into engagement in the recesses 4 and 5. When the pawl 12 is engaged with the drive ring 1, rotation of the drive shaft 2 causes eccentric rotation of the cam 9, resulting in longitudinal movement of the connecting rod 17 in which the cam 9 is mounted in the bearings 8. This causes the harness frame (not shown) to move in the direction of the longitudinal axis 18 to shift the harness frame from one shed position to the other, at which shed positions the drive shaft 2 dwells temporarily and the pawl is disengaged so that the harness frame remains in the shed position while the drive shaft 2 again rotates until the opposite recess 4 or 5 is in position for subsequent engagement by the pawl 12.

Manipulation of the pawl 12 to disengage the pawl projection 10 from the recess 4 or 5 is controlled by external operating members 20 and 21, shown only partially in FIGS. 1 and 2. These operating members 20 and 21 are in the form of levers that are operated according to a predetermined program to move between the positions shown in solid lines in FIGS. 1 and 2 to the phantom lines shown in FIG. 1 by application of forces in the direction indicated as P and P' toward the longitudinal axis 18 and then back to the initial position after release of the force.

The pawl 12 can be moved between the engaging position and the disengaging position and vice versa only at the dwell position of the intermittently driven drive ring 1 and is secured in engagement in the recesses 4 and 5 during rotary movement of the cam 9 by locking means 29. The locking mechanism is actuated to release the pawl for disengagement by actuating means in the form of levers 32 and 32' at diametrically opposed positions on the connecting rod 17, to which they are pivotally mounted on studs 34 and 34', with the actuating levers 32 and 32' being operated by the operating members 20 and 21.

The locking means 29 includes a locking element 23 that is pivotally mounted on a stud 24 on the other arm 15 of the pawl 12 and is biased in the direction of locking by a coil spring 33 extending between the locking element 23 and the pawl leg 15.

Blocking means are provided in the form of two spaced blocking members 27 and 28 fixed on the face of the eccentric cams 9 for guiding the actuating levers 32 and 32', with the spacing between blocking members 27 and 28 being such as to permit the projections 22 and 22' on the actuating levers to move between the blocking members into actuating engagement with the locking element 23.

In the position of the components illustrated in FIG. 1, the locking element 23 is shown between the blocking members 27 and 28 in engagement against a stop 30 formed in one of the blocking members 27, thereby locking the pawl 12 with its projection 10 in the recess 4 of the drive ring 1, and with a coil spring 7 mounted on the other blocking member 28 and acting on the bracket 16 to bias the pawl 12 in engagement with the drive ring 1.

The actuating levers 32 and 32' are biased by contraction springs 34 and 35 mounted on the connecting rod 17 to normally position the projections 22 and 22' of the actuating levers out of engagement with the locking element 23. In this condition, the eccentric cam 9 is driven by the drive ring 1 in the direction of the arrow 3 to move the harness frame from one shed position to the other.

When the harness frame reaches an opposite shed position, the operating member 20 is programmed to move toward the longitudinal axis 18 and thereby force the actuating lever 32 to move inwardly in the space between the blocking members 27 and 28 and into unlocking engagement with the locking element 23 to cause the locking element 23 to disengage from the stop 30 and, upon further movement of the actuating lever 32 under the force P applied to the operating member 20 to rock the pawl 12 into the position shown by phantom lines where the locking element is in the position 23', the leg on which it is mounted to the position 15' and the pawl projection to the position indicated at 10' out of engagement in the recess 4, which results in the harness frame being maintained in the shed position to which it has been previously shifted.

When the force P is relieved, the operating member 20 returns outwardly, allowing the actuating lever 32 to pivot and more its projection 22 out of engagement with the locking element 23, thereby allowing the spring 7 to bias the pawl against the drive ring 1 so that when the next recess 5 is positioned at the projection 10 of the pawl 12, the projection 10 will engage in the recess to connect the eccentric cam 9 with the drive shaft 2 for rotation therewith and by eccentric motion cause longitudinal shifting of the harness frame to the opposite shed position.

Figure 3:
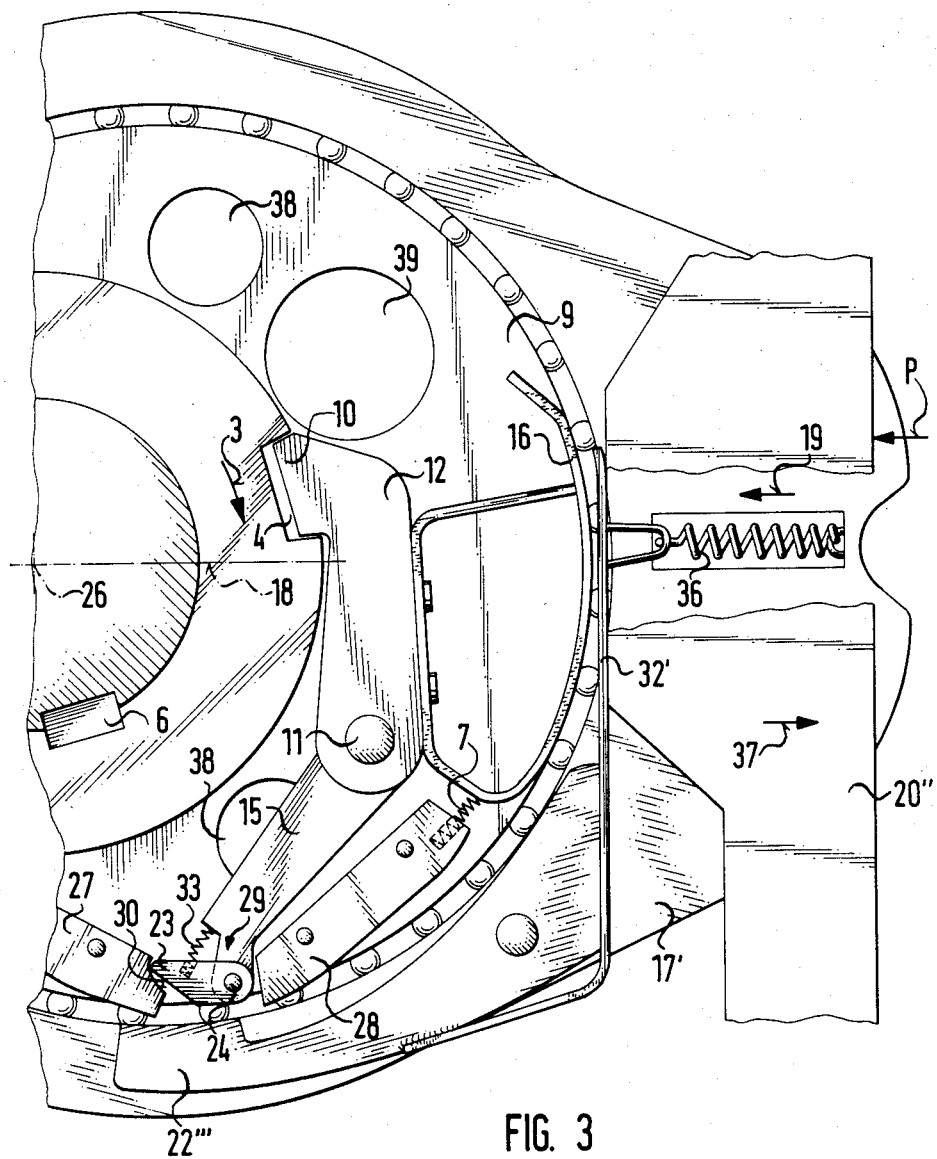
FIG. 3 is a partial elevational view of a modified embodiment of the drive connection of FIG. 1.

Referring to the modified embodiment of FIG. 3, the eccentric cam 9 is formed with round openings 38 and 39 to reduce the mass, and an arm 32' is formed on the actuating lever in a position to engage the bracket 16 that is mounted on the pawl 12 when the eccentric cam 9 is in the dwell position. The operating member 20'' is moved inwardly by the force P against the arm 32' to position it in bracket engagement to bias the pawl 12 into engagement with the drive ring. In this modified embodiment, the actuating lever projection 22''' is normally biased in the direction of engagement with the locking element 23 by a contraction spring 36 mounted on the connecting rod 17' and connected to the arm 32' of the actuating lever. When the operating member 20'' is moved inwardly, it displaces the actuating lever arm 32' against the biasing of the spring 36 to pivot the actuating lever projection 22''' to a position out of engagement with the locking element 23. Upon movement of the operating member 20'' back in the direction of arrow 37, the spring 36 causes pivoting of the actuating lever into position for unlocking engagement of the locking element 23 and pivoting of the pawl 12 out of engagement with the drive ring.

In other respects, the components of the embodiment of FIG. 3 are the same as those of the embodiment of FIGS. 1 and 2. It should be noted that while rotation of the drive ring 1 is shown to be in a clockwise direction as indicated by the arrow 3, it could as well be in the opposite counterclockwise direction.

Figure 4:
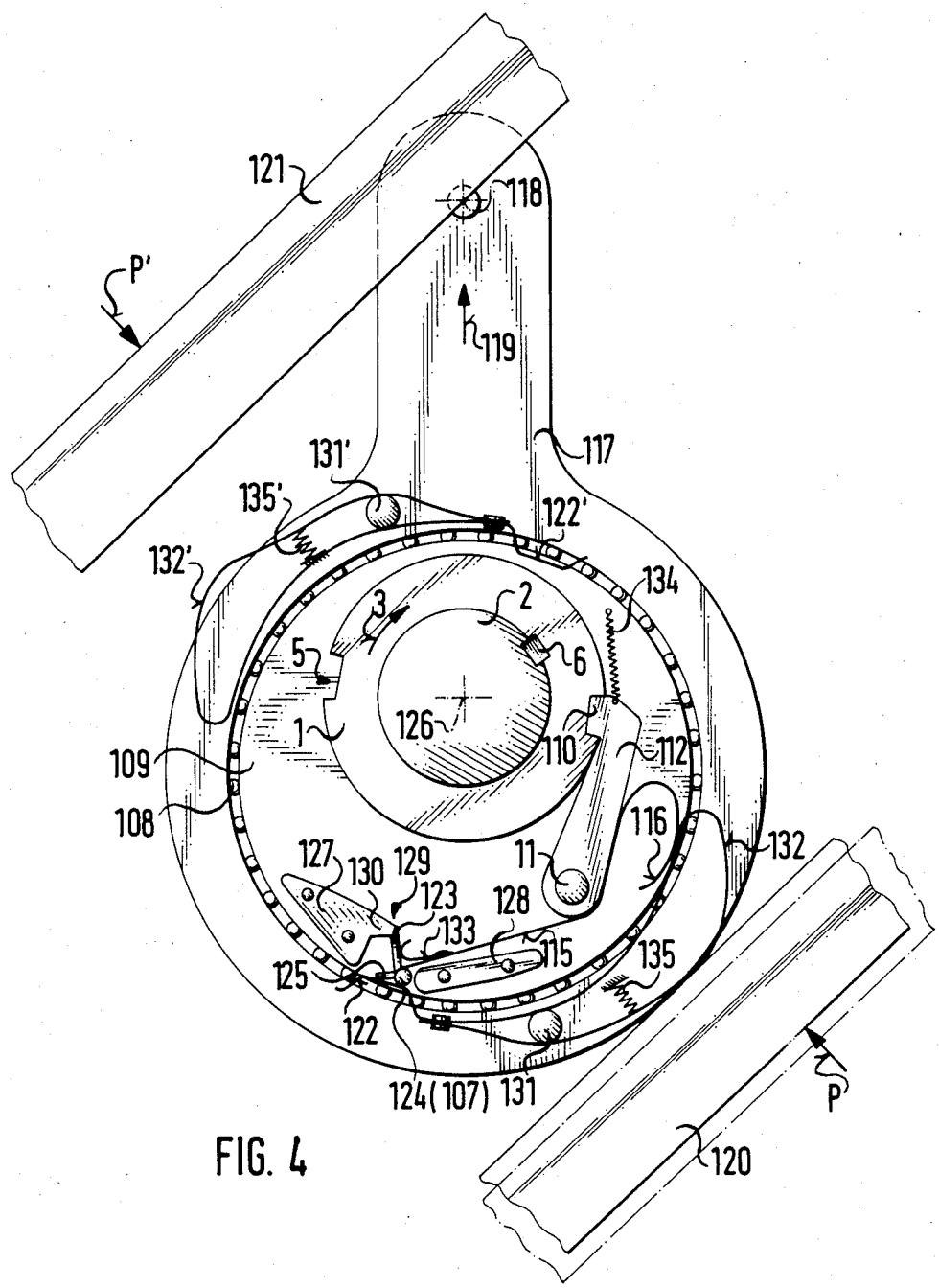
FIG. 4 is an elevational view of an alternative embodiment of the drive connection of the present invention showing the parts in driving engagement.
Figure 5:
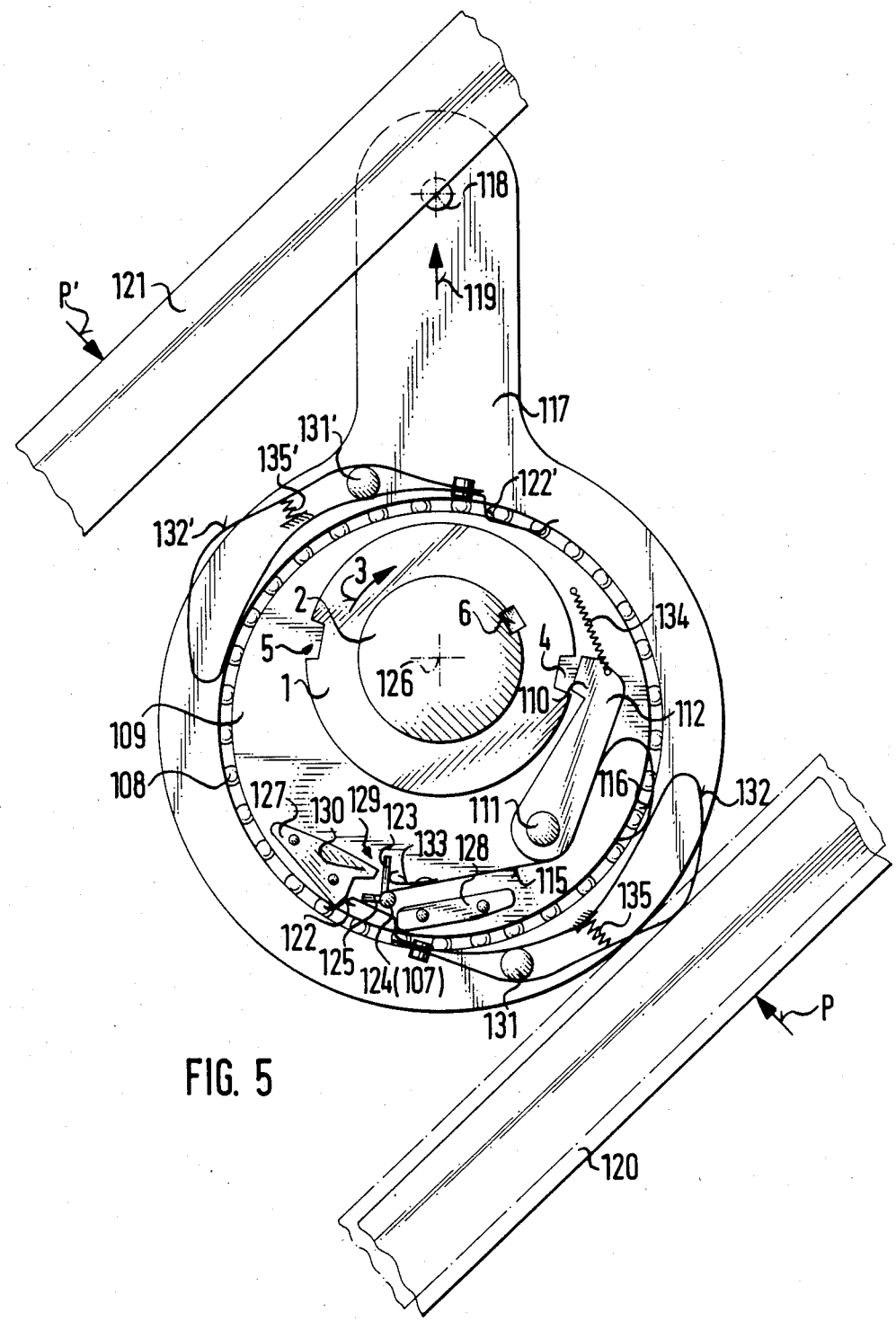
FIG. 5 is a view similar to FIG. 4 showing the drive connection disengaged.

Referring to the alternative embodiment illustrated in FIGS. 4 and 5, the drive connection involves the same form of drive shaft 2, drive ring 1 fixed by a key 6 to the drive shaft and having recesses 4 and 5, and an eccentric cam 109 mounted on the drive ring 1 and within a roller bearing 108 within a connecting rod 117 that reciprocates in the direction of the arrow 119 along the longitudinal axis when the eccentric cam 109 is connected to the drive ring 1 and the drive ring is rotating in the direction indicated by the arrow 3. As in the previous embodiments, the drive shaft 2 rotates intermittently in 180 degree increments.

The eccentric cam 109 has a stud 111 projecting therefrom on which a pawl 112, in the form of a rocker member, is pivotally mounted. This pawl 112 has a projection 110 that is engagable in recesses 4 and 5 formed in the surface of the drive ring 1. The projection 110 is formed on one arm of the pawl 112 and the other arm is in the form of a leaf spring 115 that is formed in an eye 107 at its outer end. This leaf spring 115 is secured to the pawl 112 and has a bent end 116 projecting therefrom.

When the pawl 112 is drivingly connecting the eccentric cam 109 to the drive ring 1, the fulcrum 118 of the connecting rod 117 shifts in the direction of the arrow 119 to move a harness frame connected to the fulcrum 118 from one shed position to another. In doing so, the forces acting through the fulcrum 118 are directed either toward or away from the central axis 126 of the drive shaft 2.

The operating member 120, which is program controlled, is moved between the position shown in FIG. 4 in which it is positioned inwardly by the force P directed against the axis 126 of the drive shaft 2 and the return position illustrated in FIG. 5 in which the force P has been relieved.

The pawl 112 can be moved only when the eccentric cam 109 is in a dwell position and is prevented from movement during rotation of the eccentric cam 109 by locking means 129. An actuating lever 122 is mounted on a stud 131 on the connecting rod 117 and is in the form of a leaf spring biased by a coil spring 135 in a normal position in which the actuating lever 122 is positioned for actuating engagement of a locking element 123 of the locking means 129 to cause disengagement of the pawl from the drive ring. The actuating lever 122 is controlled by the operating member 120 or the opposite member 121 such that inward movement of the operating member 120 will cause engagement with an inward pivoting of the arm 132 of the actuating lever 122, causing the portion of the actuating lever 122 at the locking means 129 to move outwardly out of unlocking position. This inward movement of the operating member 120 against the arm 132 of the actuating lever 122 causes the arm 132 to be biased against the bent end 116 of the leg 115 of the pawl 112, thereby biasing the pawl 112 for engagement of the pawl projection 110 into one of the recesses 4 or 5.

The locking element 123 is mounted on a pin 124 that is carried in the aforementioned spring eye 107 and is biased in a locking position by a leaf spring 133 fixed on the leg 115 of the pawl 112. The leaf spring 133 biases the locking element in a counterclockwise direction to engage the stop 130 formed in the blocking member 127. The locking element 123 also includes an arm 125 that projects into the path of the actuating lever 122 so that upon inward movement of the actuating lever 122 the arm 125 will be engaged and will be pivoted inwardly, causing corresponding unlocking pivoting of the locking element 123 away from the stop 130. Two blocking members 127 and 128 mounted on the eccentric cam 109 serve the same purpose as explained with reference to the blocking members 27 and 28 of the embodiment of FIGS. 1 and 2.

A relatively weak coil spring 134 is connected between the eccentric cam 109 and the outer end of the pawl 112 adjacent the projection 110 to apply continual biasing of the pawl toward drive ring engagement, but being sufficiently weak that it can be easily overcome by operation of the actuating lever 122 against the leg 115 of the pawl 110 to pivot the pawl out of drive ring engagement.

In FIG. 5, the pawl 112 is illustrated in disengaged condition and the operating member 120 in its furthest position from the central axis 126 of the shaft 2. In this position of the components, the eccentric cam 109 is not being rotated and the spring 135 is pivoting the arm 132 of the actuating lever 122 clockwise so that the actuating lever 122 has entered between the blocking members 127 and 128 and has unlocked the locking element 12, maintaining the pawl 112 disengaged.

When the pawl 112 is to be reengaged with the drive ring 1, the operating member 120 is programmed to move inwardly under the force P toward the central axis 126 while the drive ring 1 is still rotating. The operating member 120 then presses against the resilient spring arm 132 of the actuating lever 122, which arm presses against the bent end 116 of the leaf spring leg 115 of the pawl 112, which is thereby resiliently biased inwardly. In this position, the operating member 120 has caused the actuating lever 122 to pivot about the stud 131 outwardly away from the locking element 123 so that unlocking cannot occur. Under this condition, when the drive ring 1 reaches its dwell position, the inwardly biased pawl projection 110 will automatically engage in the adjacent recess 4 or 5 of the drive ring 1 and the locking element 123 will engage the stop 130 to lock the pawl projection 110 in engagement.

The second operating member 121 may be connected through parallel guides with the first operating member 120 to assure simultaneous operation. This second operating member 121 can be acted on by an inwardly directed force P' against an arm 132' of a second leaf spring actuating lever 122' that is diametrically opposite the actuating lever 122 acted on by the operating member 120 and pivoting about the stud 131' on the connecting rod 117.

Figure 6:
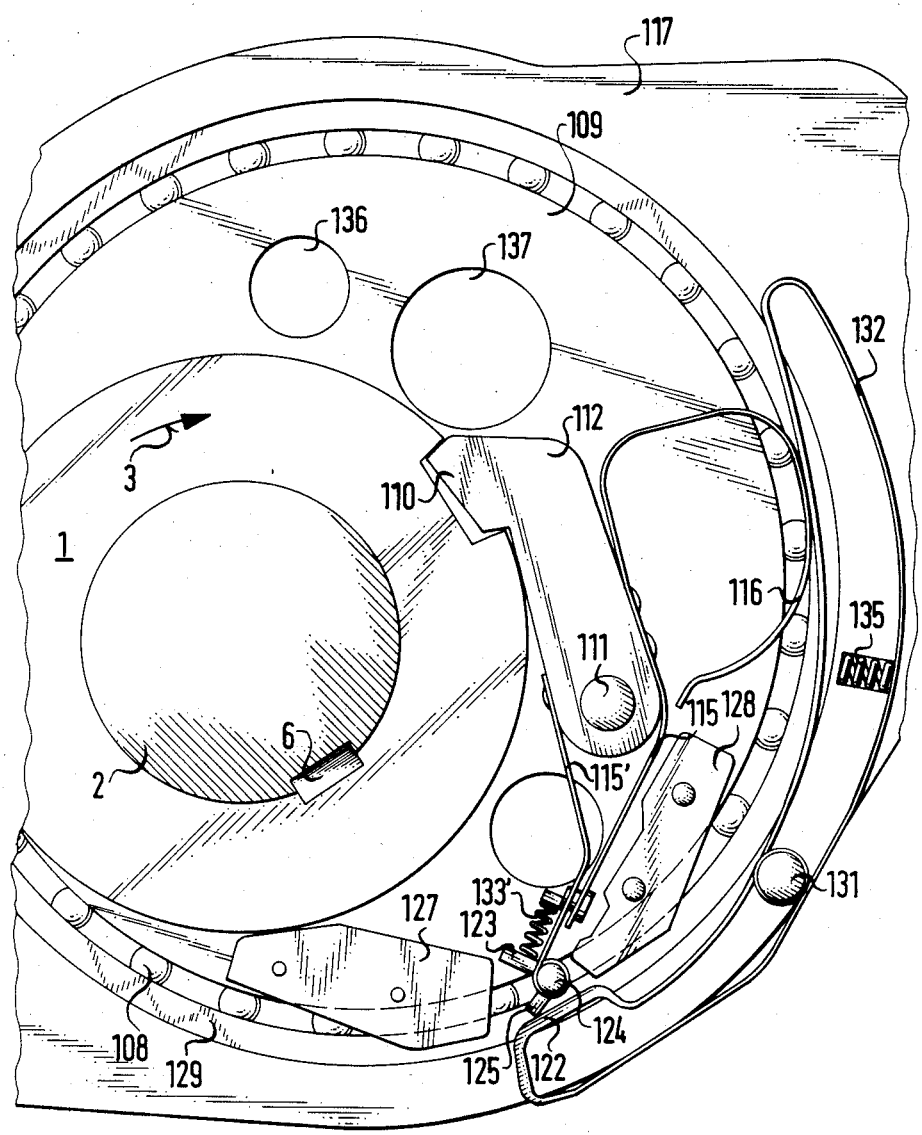
FIG. 6 is a partial elevational view of another embodiment of the drive connection of the present invention showing the parts in driving connection.
Figure 7:
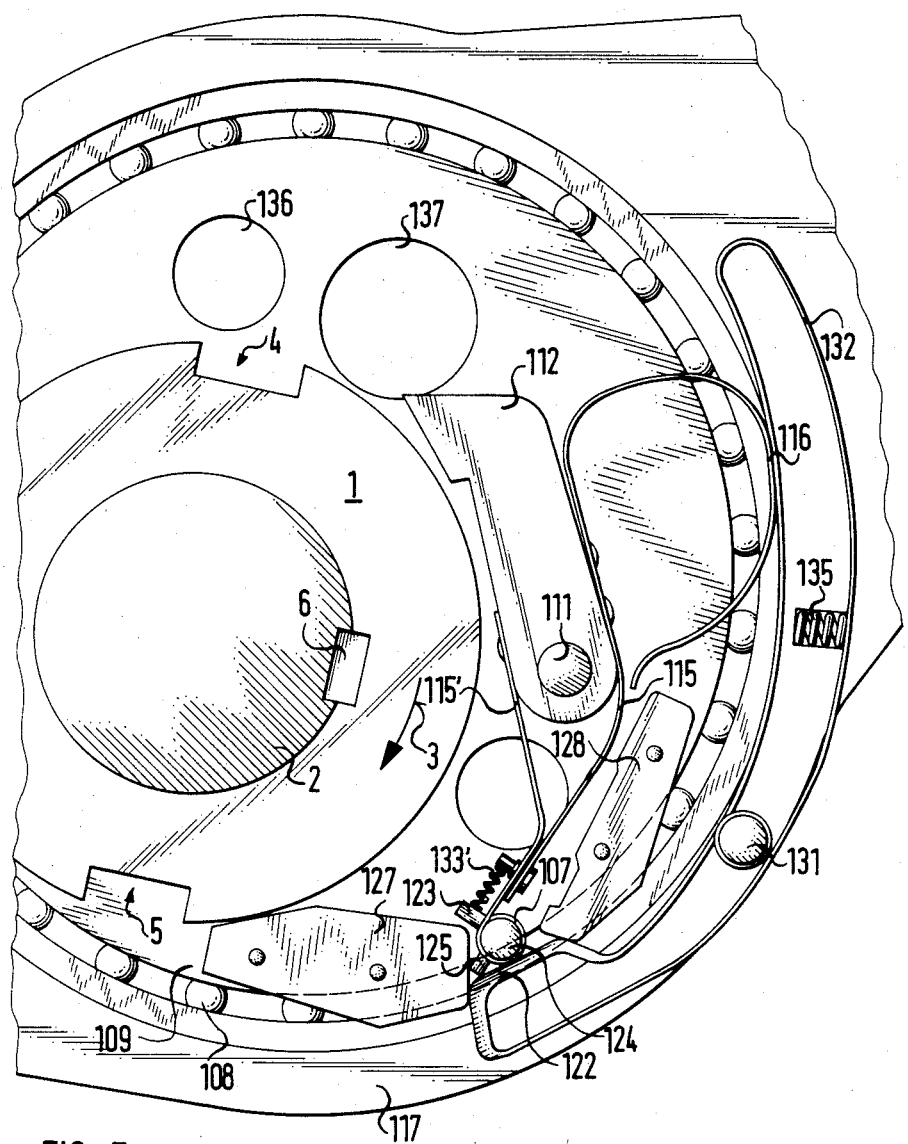
FIG. 7 is a view similar to FIG. 6 showing the drive connection disengaged.

Another embodiment of the present invention is illustrated in FIGS. 6 and 7. This embodiment is similar to that of FIGS. 4 and 5 and corresponding parts are indicated by corresponding reference numerals. In this embodiment, the return spring for the locking means 129 is a pressure spring 133' connected to the resilient leaf spring leg 115 of the pawl 112 and extending against the locking element 123. The spring 134 of the embodiment of FIGS. 4 and 5 has been eliminated, and the notch form of stop 130 of FIGS. 4 and 5 has been eliminated, with the locking element 123 simply abutting the face of the blocking member 127 to provide a stop for the locking element. In this form, the eccentric cam 109 has round openings 136 and 137 to reduce the mass. A leaf spring 115' supplements the leaf spring leg 115 of the pawl 112 and forms the spring eye 107 in which the pin 124 of the locking element 123 is mounted. Otherwise, the individual parts of the embodiment of FIGS. 6 and 7 are the same as those of FIGS. 4 and 5.

In the position of the components as illustrated in FIG. 6, the pawl 112 is engaged in the drive ring recess and the eccentric cam 109 has not yet quite reached the dwell position. Nevertheless, the actuating lever 122 is already moving in the direction of the unlocking position and has unlocked the locking element 123 against the force of the spring 133' by action against the arm 125. Further movement of the actuating lever 122 inwardly will act against the spring eye 107 to force disengagement of the pawl 112 from the drive ring recess at the proper time, following which the drive ring 1 will rotate with the pawl 112 disengaged and the connecting rod 117 remaining in its dwell position, which is illustrated in FIG. 7.

In this embodiment, as well as in the other embodiments, the drive connection will function similarly when the drive ring 1 is rotated in a counterclockwise direction as well as in the clockwise direction as indicated by the arrow 3.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A drive connection for reciprocating an operating member such as a harness frame of a textile loom by transmitting intermittent rotation of a drive shaft through an eccentric cam into reciprocation of a connecting rod, said drive connection comprising an annular drive ring fixed on the drive shaft and having a recess formed therein, a pawl pivotally mounted on the eccentric cam for engagement in and disengagement from said recess for selective drive connection and disconnection of said cam to said drive shaft, pawl locking means for releasably locking said pawl in engagement in said recess for driving connection of said drive shaft to said cam, actuating means mounted on said connecting rod and engagable with said locking means to disengage said pawl from said recess and thereby disconnect said eccentric cam from the drive of said drive shaft upon programed operation of said actuating means, and blocking means mounted on said eccentric cam for blocking said actuating means from engagement with or disengagement from said locking means except when said eccentric cam is positioning said connecting rod in a predetermined position, such as a shed position of a harness frame.

2. A drive connection according to claim 1 and characterized further by means normally biasing said pawl into engagement in said recess, and said actuating means being operable to overcome the biasing of said biasing means.

3. A drive connection according to claim 1 and characterized further by an operating member programably engagable with said actuating means to operate said actuating means to engage said locking means.

4. A drive connection according to claim 3 and characterized further in that said operating member is engagable with said pawl to retain said pawl in engagement in said recess and is movable between a pawl retaining position and an actuating means operating position.

5. A drive connection according to claim 3 and characterized further in that said actuating means is spring biased out of engagement with said pawl and said operating member acts against said biasing to operate said actuating means.

6. A drive connection according to claim 1 and characterized further by means normally biasing said actuating means out of engagement with said locking means.

7. A drive connection according to claim 1 and characterized further in that said pawl is in the form of a rocker member mounted on said eccentric cam, one leg of said rocker member having a projection engagable in said recess and the other leg of said rocker member having a locking element mounted thereon for releasable locking engagement against a stop on said eccentric cam, said blocking means comprises two spaced blocking members positioned to permit movement of said actuating means into the space between blocking members for releasing engagement of said locking means when said eccentric cam is positioning said connecting rod in a predetermined position.

8. A drive connection according to claim 7 and characterized further in that said stop is formed on one of said blocking members.

9. A drive connection according to claim 1 and characterized further in that said locking means comprises a locking element movably mounted on said pawl and releasably engagable against a stop on said eccentric cam to prevent disengagement of said pawl from said recess, and said actuating means acts to release said locking element from said stop.

10. A drive connection according to claim 9 and characterized further in that said stop is formed on said blocking means.

11. A drive connection according to claim 9 and characterized further in that said locking element is spring biased into locking enegagement aginst said stop and said actuating means acts against said biasing to release said locking element.

12. A drive connection according to claim 1 and characterized further in that said pawl includes a resilient segment engagable by said actuating means to resiliently bias said pawl in engagement in said recess.

13. A drive connection according to claim 12 and characterized further in that said actuating means has a resilient segment engagable with said resilient segment of said pawl.

14. A drive connection according to claim 1 and characterized further in that said actuating means includes a resilient segment engagable with said pawl to resiliently bias said pawl in engagement in said recess.

15. A drive connection according to claim 1 and characterized further by spring means biasing said pawl into engagement in said recess, said spring means being sufficiently weak to be overcome by said actuating means to disengage said pawl.

16. A drive connection according to claim 1 and characterized further in that there are two actuating means positioned opposite each other on said connecting rod for engaging said locking means at opposite positions of said connecting rod.

17. A drive connection according to claim 16 and characterized further by two operating members, each programmably engagable with one of said actuating means to cause said actuating means to engage said locking means.

* * * * *